(12) United States Patent
Busser et al.

(10) Patent No.: US 9,003,190 B2
(45) Date of Patent: *Apr. 7, 2015

(54) METHOD AND APPARATUS FOR PROVIDING A KEY CERTIFICATE IN A TAMPERPROOF MANNER

(75) Inventors: Jens-Uwe Busser, München (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 125 days.

This patent is subject to a terminal disclaimer.

(21) Appl. No.: 13/813,993

(22) PCT Filed: Jul. 22, 2011

(86) PCT No.: PCT/EP2011/062645
§ 371 (c)(1),
(2), (4) Date: Feb. 4, 2013

(87) PCT Pub. No.: WO2012/016859
PCT Pub. Date: Feb. 9, 2012

(65) Prior Publication Data
US 2013/0132721 A1    May 23, 2013

(30) Foreign Application Priority Data
Aug. 3, 2010    (DE) .......................... 10 2010 033 231

(51) Int. Cl.
*H04L 9/32*        (2006.01)
*H04L 9/08*        (2006.01)

(52) U.S. Cl.
CPC .. *H04L 9/32* (2013.01); *H04L 9/08* (2013.01); *H04L 9/3228* (2013.01); *H04L 9/3263* (2013.01)

(58) Field of Classification Search
CPC ........ H04L 9/32; H04L 9/3263; H04L 9/3228
USPC ......................................................... 713/168
See application file for complete search history.

(56) References Cited

U.S. PATENT DOCUMENTS

| 5,825,300 | A  | 10/1998 | Bathrick et al. ............. 340/5.74 |
| 6,292,896 | B1 | 9/2001  | Guski et al. .................... 713/169 |

(Continued)

FOREIGN PATENT DOCUMENTS

| CN | 101651675 A1    | 2/2010  | ............. H04L 29/06 |
| DE | 102005009867 A1 | 9/2006  | ................. H04L 9/30 |
| FR | 2929471 A1      | 10/2009 | ............. H04L 12/16 |
| WO | 2012/016858 A1  | 2/2012  | ............. G06F 21/00 |
| WO | 2012/016859 A1  | 2/2012  | ................ H04L 9/08 |

OTHER PUBLICATIONS

Krawczyk, H., "HMAC: Keyed-Hashing for Message Authentication," Memo, Network Working Group, 11 pages, Feb. 1997.

(Continued)

*Primary Examiner* — Mohammad W Reza
(74) *Attorney, Agent, or Firm* — King & Spalding L.L.P.

(57) ABSTRACT

A method and a server are configured to provide, in a tamperproof manner, a key certificate for a public device key of a user device, which is installed for a user, by means of a server belonging to a service provider who provides the user with a service via the user device, wherein the server provides the user device with the key certificate if a signing request message received by the user device is successfully verified by the server using a one-time password generated for the user device by the server.

14 Claims, 1 Drawing Sheet

(56) References Cited

U.S. PATENT DOCUMENTS

| | | | |
|---|---|---|---|
| 6,530,025 B1 | 3/2003 | Nakagawa et al. | 726/4 |
| 6,601,175 B1 | 7/2003 | Arnold et al. | 726/7 |
| 7,243,228 B2 | 7/2007 | Shirai et al. | 713/160 |
| 7,409,705 B2 | 8/2008 | Ueda et al. | 726/5 |
| 7,418,727 B2 | 8/2008 | Lin et al. | 726/5 |
| 7,444,508 B2 * | 10/2008 | Karjala et al. | 713/156 |
| 8,166,531 B2 | 4/2012 | Suzuki | 726/9 |
| 8,301,877 B2 * | 10/2012 | Grajek et al. | 713/156 |
| 2002/0095507 A1 * | 7/2002 | Jerdonek | 709/229 |
| 2004/0158708 A1 * | 8/2004 | Peyravian et al. | 713/156 |
| 2007/0079135 A1 | 4/2007 | Saito | 713/183 |
| 2008/0276098 A1 | 11/2008 | Florencio et al. | 713/183 |
| 2011/0022845 A1 | 1/2011 | Pietre-cambacedes et al. | 713/175 |
| 2013/0132721 A1 | 5/2013 | Busser et al. | 713/168 |
| 2013/0145449 A1 | 6/2013 | Busser et al. | 726/7 |

OTHER PUBLICATIONS

Kaliski, B., "PKCS #10: Certification Request Syntax Version 1.5," Memo, Network Working Group, RSA Laboraties East, 9 pages, Mar. 1998.

Nystrom, M. et al., "PKCS #9: Selected Object Classes and Attribute Types Version 2.0," Memo, Network Working Group, RSA Security, 43 pages, Nov. 2000.

Nystrom, M. et al., "PKCS #10: Certification Request Syntax Specification Version 1.7," Memo, Network Working Group, RSA Security, 15 pages, Nov. 2000.

IEEE Standard for a Precision Clock Synchronization Protocol for Networked Measurement and Control Systems, IEEE Instrumentation and Measurement Society, IEEE Std 1588-2088, Jul. 24, 2008.

German Office Action, Application No. 10 2010 033 232, 2 pages, Jan. 26, 2011.

German Office Action, Application No. 10 2010 033 231, 5 pages, Apr. 11, 2011.

International Search Report and Written Opinion, Application No. PCT/EP2011/062641, 6 pages, Sep. 6, 2011.

International Search Report and Written Opinion, Application No. PCT/EP2011/062645, 20 pages, Nov. 25, 2011.

Chinese Office Action, Application No. 201180037990, 11 pages, Sep. 3, 2014

Chinese Office Action, Application No. 201180037981, 12 pages, Sep. 2, 2014.

* cited by examiner

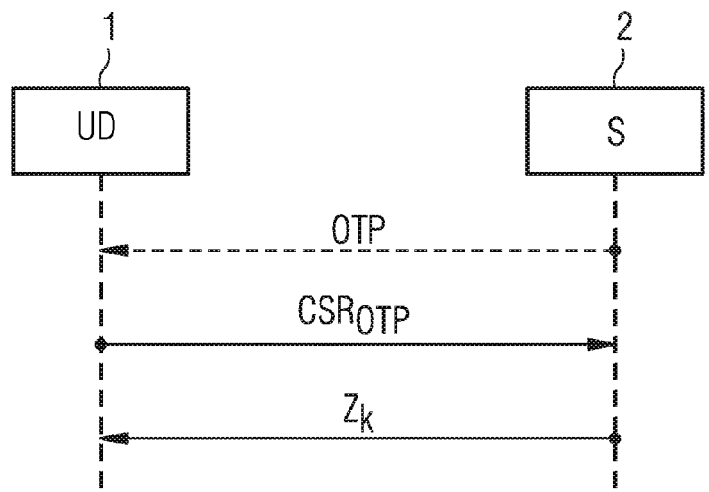
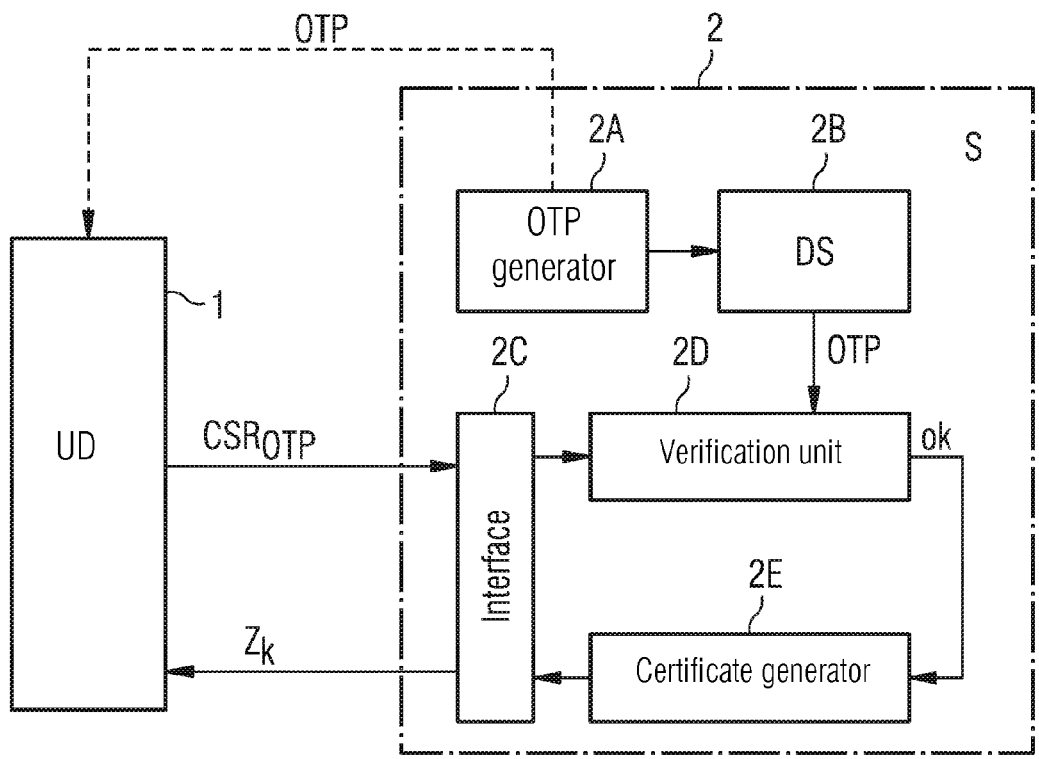

METHOD AND APPARATUS FOR PROVIDING A KEY CERTIFICATE IN A TAMPERPROOF MANNER

CROSS-REFERENCE TO RELATED APPLICATIONS

This application is a U.S. National Stage Application of International Application No. PCT/EP2011/062645 filed Jul. 22, 2011, which designates the United States of America, and claims priority to DE Patent Application No. 10 2010 033 231.3 filed Aug. 3, 2010. The contents of which are hereby incorporated by reference in their entirety.

TECHNICAL FIELD

The disclosure relates to a method and a device for the manipulation-proof provision of a key certificate, making use of a one-time password for the authorization and integrity protection of a signing request message.

BACKGROUND

In many application scenarios, it is necessary to link in a user device which has been set up in a user's home area by a service provider. For example, in the case of an intelligent power supply network, an energy supplier can provide an energy gateway as a user device in a user's household. Energy gateways of this type serve principally to optimize the consumption and feeding in of energy by local energy consumers and producers. In this case, these energy gateways serve to control energy producers, such as for example solar cells or combined heat and power systems in the household concerned. These energy gateways make it possible, in addition, for the user concerned to participate in the power supply under conditions which are favorable to him, by feeding energy into the energy supply network at points in time when the demand for energy is high. In order to be able to provide such a decentralized intelligent energy supply system with a plurality of energy gateways, it is necessary to link the various participants or users and the various energy service providers or energy suppliers, as applicable, securely into the network. In doing so, the identity or a proof of the identity, as appropriate, of the user device or energy gateway concerned plays an essential role. The identity of the user device, for example the energy gateway, is in this case conventionally ensured in the form of a key certificate and an associated private key. The required material for the key is here produced by the user device, for example the energy gateway, itself.

There are a host of different user devices which are set up by various service providers on users' premises, in particular in the home area, wherein the service providers make a service available to the user via the user device which has been set up. Examples of such user devices, apart from energy gateways which can be used to exchange data with an energy provider, are medical devices for the exchange of patient data with a service provider, for example a medical center, or alarm devices such as for example fire alarms, for transmitting alarm messages to a service provider, for example a fire station. Beside these there is a host of communication devices, for example pay-TV boxes, which are set up on a user's premises by a service provider in order to transmit information data, for example films, to the user.

Most of the user devices of this type are freely marketed, obtainable for example in electrical markets. If a user device of this type is obtained from the trade by a user and set up on his premises, then in order to be able to receive the desired service the user must register with a server of the service provider. In doing this, a public key generated by the user device can be certified on the service provider as part of the registration procedure by the presentation of a digital certificate, without the need for a contract between the user and the service provider to have been concluded at the time of purchase of the user device. This can also be carried out as part of the initial registration.

However, in this case there is conventionally the danger that key material which is to be certified, is sent to the service provider's server for certification in a message to the service provider from a person other than the actual customer or user, as applicable, who wishes to obtain the service from the service provider. This is possible because there is as yet no authenticated link between the participating components, that is to say the user device and the service provider's server.

SUMMARY

In one embodiment, a method is provided for the manipulation-proof provision of a key certificate for a device-key, for a user device which is installed on a user's premises, by a server of a service provider which makes a service available to the user via the user device, wherein the server provides the key certificate to the user device if a signing request message received from the user device is successfully verified by the server by reference to a one-time password generated by the server for the user device, wherein a cryptographic device-key pair, which comprises a public device-key and a private device-key for the user device, is generated locally for the user device which is to be installed on the user's premises, wherein the user device compiles a signing request message for the locally generated public key, wherein the signing request message is combined logically with the one-time password for the user device which has been read out from the data medium, and wherein a keyed-hash value is calculated for at least one data field in the signing request message as a function of the one-time password for the user device and the locally generated public device-key.

In a further embodiment, the service provider's server generates the one-time password for a device ID for the user device and stores it together with the device ID of the user device in a data store of the server.

In a further embodiment, the one-time password which has been generated for the user device is sent out to the user by the service provider by means of a data medium.

In a further embodiment, the one-time password for the user device, which is transported on the data medium which is sent out, is read out from the data medium which was sent out by means of an interface on the user device.

In a further embodiment, the data medium is integrated into the user device or comprises a separate data medium which is linked to the user device for the purpose of reading out the one-time password.

In a further embodiment, the service provider sends the data medium out to the user together with the user device or separately.

In a further embodiment, the user device transmits to the service provider's server, over a cryptographically secured communication channel, the signing request message compiled by the user device, together with the one-time password for the user device read out from the data medium.

In a further embodiment, the compiled signing request message, which is transmitted to the service provider's server by the user device, is verified by the server by reference to the one-time password for the user device stored in the data store of the server.

In another embodiment, a server is provided for carrying out any of the methods disclosed above for the manipulation-proof provision of a key certificate for a public device-key for a user device, which is installed on a user's premises, which receives a service from the server via a user device, wherein the server provides the key certificate to the user device if a signing request message which is received from the user device is successfully verified by the server by reference to a one-time password for the user device which has been generated and stored by the server.

In a further embodiment, the server includes: a one-time password generator which generates an associated one-time password for each user device, a data store in which the one-time passwords which have been generated by user devices are stored together with the device IDs of the user devices, and a verification unit which, by reference to a one-time password stored in the data store, verifies a signing request message received from a user device.

In a further embodiment, the one-time password for a user device, generated by the one-time password generator, is either filed on a data medium integrated into the user device and the user device is sent out to the user for installation, or the one-time password which has been generated for the user device is filed on a data medium which is separate from the user device, which is sent out to the user for the purpose of installing the user device either together with the user device or separately from the user device.

In a further embodiment, the server is a server of a service provider which provides a service to a user via the installed user device, wherein the user device includes: an energy gateway for the exchange of data with an energy supplier, a medical device for the exchange of patient data with a service provider, an alarm device for transmitting alarm messages to a service provider, or a communication device for the exchange of data with a service provider.

In a further embodiment, the one-time password for a user device, generated by the one-time password generator of the server, is stored on a USB stick data medium and sent out to the user.

In a further embodiment, the verification unit of the server verifies, by means of a public key for the user device, a signature in the signature request message which has been received.

BRIEF DESCRIPTION OF THE DRAWINGS

Example embodiments will be explained in more detail below with reference to figures, in which:

FIG. 1 shows a signal diagram to explain aspects of the disclosed method;

FIG. 2 shows a block diagram of an example embodiment of a server for manipulation-proof provision of a key certificate.

DETAILED DESCRIPTION

Embodiments of the present disclosure provide a method and a device for the manipulation-proof provision of a key certificate for a device-key for a user device.

Some embodiments provide a method by which a key certificate for a device-key, for a user device which is installed on a user's premises, is provided in a manipulation-proof way by a server of a service provider which makes a service available to the user via the user device, wherein the server provides the key certificate to the user device if a signing request message received from the user device is successfully verified by the server by reference to a one-time password generated by the server for the user device.

With the disclosed method, a signing request message, CSR (Certificate Signing Request), which is sent to the service provider's server from a not (yet) trustworthy component or from a not yet trustworthy user device, as applicable, is logically combined with a one-time password (OTP) which has been generated by a component of the future service provider.

In one embodiment, the one-time password (OTP) is generated for a particular device ID of the user device by a server of the service provider. This device ID could be, for example, the serial number of the user device or a Mac address of the user device. The server may store the one-time password OTP which has been generated, together with the device ID of the user device, in a data store to which the server has access.

In one embodiment, the service provider uses a data medium to send out to the user the one-time password OTP which has been generated for the user device.

In one embodiment, the one-time password OTP for the user device, which is transported on the data medium sent out, is read out from the data medium which was sent out by means of an interface on the user device.

In one embodiment, the data medium is integrated into the user device, and is thus sent out to the user together with the user device. For example, the data medium may be formed by an internal store in the user device.

In an alternative embodiment, the data medium is a separate data medium, which is connected to the user device for the purpose of reading out the one-time password OTP stored on it.

In one embodiment, the service provider or a seller of the user device sends this data medium out to the user or customer, as applicable, together with the user device.

For example, the data medium is sent out to the user together with the user device in a postal package. The data medium could be, for example, a USB stick which is delivered to the user together with the user device in a postal package or some other packaging.

In one embodiment, the data medium is not sent out to the user together with the user device, but separately. The security against attempts at manipulation is thereby increased.

In one embodiment, a cryptographic device-key pair is generated locally for the user device which is to be installed on the user's premises. The device-key pair here comprises a public device-key and a private device-key for the user device. The cryptographic device-key pair is generated on the user's premises. With one possible embodiment, the cryptographic device-key pair is generated by the user device itself.

In one embodiment, a signing request message CSR for the locally generated public device-key is compiled by the user device. This signing request message CSR is logically linked or combined, as appropriate, with the one-time password OTP for the user device read out from the data medium, for example the USB stick.

In one embodiment, a keyed-hash value is calculated, for at least one data field in the signing request message CSR, as a function of the one-time password OTP for the user device and the locally generated public device-key.

In one embodiment, the user device transmits to the service provider's server the signing request message CSR compiled by the user device, together with the one-time password OTP for the user device read out from the data medium, via a cryptographically secured communication channel.

In one embodiment, the signing request message CSR which has been compiled, which the user device transmits to the service provider's server, is verified by the server by reference to the one-time password for the user device stored in the server's data store.

Other embodiments provide a server for the manipulation-proof provision of a key certificate for a device-key, for a user device which is installed on the premises of a user who receives a service from the server via the user device, wherein the server provides the key certificate to the user device if a signing request message CSR received from the user device is successfully verified by the server by reference to a one-time password OTP for the user device generated and stored by the server.

In one embodiment, the server has a one-time password generator which generates an associated one-time password for each user device.

In one embodiment, the server has in addition a data store, in which the one-time passwords OTPs which have been generated by user devices are stored together with the associated device IDs for the user devices.

In another embodiment, this server has a verification unit which, by reference to a one-time password OTP stored in the data store, verifies a signing request message CSR received from a user device.

In one embodiment, the server's verification unit verifies in addition a signature in the signature request message CSR which it has received, by means of a public device-key for the user device.

The signature request message can be received by the server from the user device which has been set up, for example, over a data network. This data network could, for example, be the internet.

In one embodiment, the one-time password OTP for a user device, generated by the server's one-time password generator, is filed on a data medium integrated into the user device, wherein the user device together with the data medium integrated into it is sent out to the user by the service provider, either directly or indirectly via the sales partners.

In an alternative embodiment, the one-time password generated by the one-time password generator of the service provider's server is filed on a data medium which is separate from the user device which is sent out by the service provider, together with the user device or separately from the user device, directly or via sales partners, for the purpose of installing the user device.

In one embodiment, the server is a server of a service provider which makes a service permanently available to the user via the installed user device.

As can be seen from FIG. 1, a user device 1 may have a communication link with a server 2, according to an example embodiment. This communication link could be one or more wireless or wired data networks.

The user device 1 can be a permanently installed user device in a user's home area, but can also be a mobile terminal device. The user device 1 could be, for example, an energy gateway for the exchange of data with an energy supplier. In addition, user device 1 could also be a medical device for the exchange of patient data with a health service provider, or an alarm device for transmitting alarm messages to a service provider, for example a fire station. Furthermore, user device 1 could be a communication device for the exchange of data with a service provider, for example a pay TV box for the receipt of multi-media data.

Server 2 could be, for example, the server of a service provider which makes a service available to the user of user device 1. If user device 1 is, for example, an energy gateway of a customer of an electricity supply organization, the server 2 of the electricity supplier can, for example, provide the user regularly with billing data which states how much energy the user of user device 1 has drawn from the electricity network, or how much energy the user has fed into the network, as applicable. Further services are possible. For example, the electricity network operator's server 2 will send across to the user's user device 1 data relating to a weather forecast in the area around user device 1. For example, if user device 1 is located in Southern Bavaria, the server 2 will supply the user device 1 with weather forecasting data for this region, so that the user "Mr. Charles", for example, can operate his solar system for an energy supply network selectively, to suit the predicted weather. In order to make use of these services, a key certificate Z for a device-key of the user device 1 is provided by the server 2 to the user device 1 in a manipulation-proof way. Server 2 will only provide the key certificate Z to user device 1 if a signing request message CSR (Certificate Signing Request) received from the user device 1 is successfully verified by means of a one-time password (OTP) generated for the user device 1 by the server 2.

The server 2 may contain a one-time password generator which generates an associated one-time password for each user device 1. The one-time password generator of the service provider's server 2 generates a one-time password OTP for a device ID of the user device 1. This device ID could be, for example, the serial number of a user device which has been manufactured. Alternatively, the device ID could also be a Mac address of the user device 1. It is further possible that the ID is a user ID of the user or customer, as applicable. This one-time password OTP which has been generated is initially stored by the server 2 in a data store of the server 2. In this data store there is a plurality of generated one-time passwords OTPs for various user devices 1, each of which is stored away with the associated device ID of the user device 1. In addition, the service provider sends out to the user the one-time password OTP which has been generated for the user device 1 by means of a data medium. The one-time password OTP which has been generated is sent out, as indicated by the dashed line in FIG. 1, on a separate communication channel or by post. With one possible embodiment, the one-time password OTP for user device 1, transported on the data medium which is sent out, is read out from the data medium, which was sent out and was received by the user, by means of an interface on the user device 1. With one possible embodiment, the data medium is integrated into the user device 1 and forms a part of the user device 1. With this embodiment, the service provider ships the user device 1 to a user or customer, as applicable, together with the user device, for example in one package. The user then activates the user device 1, wherein the one-time password OTP stored in the integrated data medium in the user device 1 is automatically read out, if necessary after an appropriate password has been input. For example, an energy supplier sends energy gateways out to customers, wherein an appropriate one-time password OTP for the user device 1 is stored with secured access in an internal store or data medium in the user device or energy gateway 1, as applicable. For the purpose of activating the energy gateway 1 on the user's premises, the stored one-time password OTP is then read out from the internal store, if necessary after an appropriate password request.

With one alternative embodiment, the data medium is not integrated into the user device 1, but forms a separate data medium. This data medium could be, for example, a USB memory stick. With this embodiment, the service provider sends out this data medium to the user together with the user device 1, for example in one package. The user activates the user device 1 and plugs the data medium, for example a memory stick, into an interface on the user device, so that the user device can read out the one-time password from the memory stick.

With another possible embodiment, the data medium is not sent out together with the user device in one package, but is dispatched to the user separately. For example, the data medium is dispatched to the user in a separate postal package. The separate data medium does not necessarily need to be a physically handleable data medium, for example it can also be an electronic data package which is transmitted to the user device 1, for example via a local network or the internet, separately from the user device. For example, the data package could contain the transported one-time password OTP for the user device 1 as the useful data. It is further possible that the one-time password OTP for the user device 1 is sent over to the user on a separate communication channel, for example by e-mail. The separate sending of the user device 1 and of the associated one-time password increases the security against manipulation.

At the user's premises, a cryptographic device-key pair is generated locally for the user device 1 which is to be installed on the user's premises. With one possible embodiment, the cryptographic device-key pair is generated by the user device 1 itself. The locally generated cryptographic device-key pair comprises a public cryptographic device-key $K_{pub}$ and private cryptographic device-key $K_{priv}$ for the user device 1. Following this, the user device 1 compiles a signing request message OSR for the locally generated public key $K_{pub}$ and transmits it to the server 2, for example over a data network. In doing this, the signing request message CSR, which is compiled by the user device 1, is combined, in particular linked logically, with the one-time password OTP for the user device 1 which has been read out from the data medium. There are various possibilities for combining the one-time password OTP which has been read out with the signing request message CSR.

With a first embodiment, the signing request message CSR has various CSR attributes, conforming to the PKCS#9 and PKCS#10 standards, for example a Challenge Password attribute. This attribute is provided for the purpose of applying for the revocation of a certificate. With one possible embodiment, this attribute of the CSR message is used for the transport of the one-time password OTP read out from the data medium. Here, the one-time password OTP will preferably not be transmitted in clear text, but cryptographically encoded, for example by the calculation of a keyed-hash value HMAC across one or more data fields in the signing request message CSR. In doing this, a keyed-hash value HMAC is calculated for at least one data field in the signing request message CSR, as a function of the one-time password OTP for the user device 1. Alternatively, it is possible that a further attribute is defined for the signing request message CSR, which permits the transport of additional security parameters. With another variant, a new data container for the signing request message CSR is signed in such a way that an HMAC value is calculated across the entire signing request message CSR, with the one-time password OTP also being incorporated as a key.

With a further variant, the signing request message CSR compiled by the user device 1 is transmitted by the user device, together with the one-time password OTP for the user device read out from the data medium, over a cryptographically secured communication channel to the service provider's server 2. With this embodiment, the one-time password OTP can be transmitted in clear text. However, it may be preferable for the purpose of increasing security to transmit the one-time password OTP in cryptographically encoded form. With one further variant, the one-time password OTP which is read out is transmitted via an encrypted transport link. In this case, the actual sequence of transmission for the transmission of the signing request message CSR remains unchanged, because unlike an encapsulation in a dedicated data container, with this embodiment variant the encapsulation is realized through a security protocol. Here for example, the user or client, as applicable, opens to the service provider's server 2 a unilaterally authenticated TLS link, to which the service provider authenticates himself by means of a certificate. The user device 1 or client, as applicable, authenticates itself in turn over the TLS link using the one-time password OTP, for example via an http digest link. It is now possible to send out the signing request message CSR over the data link authenticated in this way from both ends. The signing request message CSR which has been compiled, which is transmitted from the user device 1 to the service provider's server 2, is verified by the server 2 by reference to the one-time password OTP for the user device 1 concerned, which is already stored in its data store.

If the signing request message CSR received from the user device 1 is successfully verified by the server 2, by reference to the one-time password OTP for the user device 1 which is stored in the data store of the server 2, the server 2 provides a key certificate $Z_k$ for the public device-key $K_{pub}$ of the user device 1. After this, in calling on the service concerned, the user device 1 can utilize this key certificate $Z_k$ which has been provided.

FIG. 2 shows a block diagram to illustrate one possible embodiment of the disclosed server 2. The server 2 is used for providing in a manipulation-proof way the key certificate $Z_k$ for a device-key, in particular a public device-key $K_{pub}$, for the user device 1. This user device 1 is installed on the premises of a user who obtains from the server 2 a service, for example the transmission of particular information data, via the user device 1. The server 2 provides the key certificate $Z_k$ to the user device 1 if a signing request message CSR received from the user device 1, for example over a data network, is successfully verified by the server 2 by reference to a one-time password OTP for the user device 1 generated and stored by the server 2.

As shown in FIG. 2, the server 2 contains a one-time password generator 2A which generates an associated one-time password for each user device 1 which, for example, is delivered to the user by the service provider. The server 2 has a data store 2B, in which are stored the one-time passwords OTPs which have been generated for the various user devices 1, together with the associated device IDs of the user devices. With the embodiment shown in FIG. 2, the data store 2B is contained in the server 2. With an alternative embodiment, the server 2 has access to an external data store 2B, for example over a network. The server 2 receives the signing request message CSR via an interface 2C over a data network which is linked to the user device 1. Here, the network could be one or more data networks, over which the signing request message CSR is transmitted from the user device 1 to the server 2. With one possible embodiment, this data network is the internet. In addition, the data network can also have a mobile radiocommunication network. The user device 1 could be a permanently installed user device or a mobile device, for example a mobile phone. The server 2 contains in addition a verification unit 2D which, by reference to a one-time password OTP stored in the data store 2B, verifies a signing request message CSR received from the user device 1. If the verification is successful, the verification unit 2D triggers a certificate generator 2E in the server 2 in such a way that a digital key certificate $Z_k$ is generated for the device-key $K_{pub}$ of the user device 1 concerned. This key certificate $Z_k$ is then transmitted via the interface 2C to the user device 1 for further use.

With one possible embodiment the server 2 generates, by means of the OTP generator 2A, a one-time password OTP which is filed, together with the associated device ID, in the data store 2B. Further, the server 2 transmits offline the one-time password OTP which has been generated to the user device 1, which could for example be an energy gateway for a private household. The user device 1 or client, as applicable, initially generates locally the key material, that is to say a device-key pair which comprises a public device-key $K_{pub}$ and a private device-key $K_{priv}$. After this, the user device 1 generates the signing request message CSR, wherein a keyed-hash value is calculated for a particular attribute across parts of the CSR, for example the Challenge Password attribute. Using this calculated keyed-hash value, the server 2 is then in a position to verify the ownership of the one-time password OTP. With one possible embodiment, the association is effected on the server 2 by, for example, a so-called Distinguished Name DN. Here, the user device 1 can enter an identifier, for example its serial number or its Mac address.

With one possible special embodiment, the following sequence of activities is carried out:

$CSR_{ATT} \in CSR$
$CRS_{ATT} = HMAC_{OTP}$
$HMAC_{OTP} = HMAC(OTP, m) = H[(OTP\_xOR\_OPAD)] || H[(OTP\_xOR\_IPAD) || m)]$ where
$m = V || ID || K_{pub}$
V = Version no. of the certificate standard
ID = Device ID of the user device (Serial no. or MAC address)
$K_{pub}$ = Public cryptographic device-key and
OPAD, IPAD predefined character strings
Further steps are:
$SIGN (CSR_{ATT}, K_{priv}) = SIGN(HMAC_{OTP}, K_{priv})$
TRANSMIT $(CSR_{ATT}; SIGN)$
VERIFY $(SIGN, K_{pub})$
VERIFY $(CSR_{ATT}; (OTP, m))$ With this embodiment, the verification unit 2D of the server 2 verifies, by means of a public device-key $K_{pub}$ for the user device 1, a signature (SIGN) of the signing request message CSR which has been received.

Following this, an attribute ($CSR_{ATT}$) of the signing request message (CSR) is verified by the verification unit 2D of the server 2 by reference to the one-time password OTP for the user device 1 generated and stored by the server 2. This can be done by the verification unit 2D calculating the keyed-hash value (HMAC), using the equation given above, in order to determine whether the user device 1 or client, as applicable is providing the correct one-time password OTP.

With one further possible embodiment, the server 2 initially generates the one-time password OTP and sends it out offline to the user device 1 or to the user, as applicable. The user or user device 1, as applicable, starts by generating locally the key material, and then opens a unilaterally authenticated link to the server by means of TSL (PEA registry). The client 1 authenticates itself using its one-time password OTP. Following this, the signing request message CSR is sent over the data link which has been authenticated by both sides. The server 2 can then generate a certificate Z and send it back to the client or the user device 1, as applicable.

With the disclosed method for manipulation-proof provision of a key certificate Z, a signing request message CSR is combined with a one-time password OTP, wherein this combination makes it possible for a service provider to sell on the open market user devices 1, for example energy gateways, which may be preconfigured in such a way that it is possible to realize a link to a user device 1 by personalization by the user. This takes place through the link to the CSR. The service provider then confirms the key material generated by the user device 1 via the certificate $Z_k$. For all subsequent data links, this certificate Z can now be used with the associated private key $K_{priv}$.

Certain embodiments of the disclosed method and system may offer the advantage that the expense of key generation and of administration by the service provider is reduced. Furthermore, the disclosed method and system make possible simple commissioning by the user. Furthermore, with the disclosed method it is possible to use an existing certification infrastructure, because only the semantics of the attribute are altered by the integration of the one-time password OTP into a CSR attribute.

What is claimed is:

1. A method for a manipulation-proof delivery of a key certificate for a device-key to a user device installed on a user's premises, by a server of a service provider that makes a service available to the user via the user device, the method comprising:
    the server generating a one-time password for the user device and transmitting the one-time password to the user device via a data medium,
    the user device locally generating a cryptographic device-key pair comprising a public device-key and a private device-key for the user device,
    in response to generating the cryptographic device-key pair, the user device compiling a signing request message for the locally generated public key,
    logically combining the signing request message with the one-time password for the user device that has been read out from the data medium,
    calculating a keyed-hash value for at least one data field in the signing request message by applying a keyed-hash function to the one-time password for the user device and the locally generated public device-key,
    the user device transmitting the signing request message to the server,
    the server verifying the signing request message received from the user device based on the one-time password generated by the server for the user device, and
    the server providing the key certificate to the user device in response to a successful verification of the signing request message.

2. The method of claim 1, wherein the service provider's server generates the one-time password for a device ID for the user device and stores it together with the device ID of the user device in a data store of the server.

3. The method of claim 1, wherein the one-time password which has been generated for the user device is sent out to the user by the service provider by means of a data medium.

4. The method of claim 3, wherein the one-time password for the user device, which is transported on the data medium which is sent out, is read out from the data medium which was sent out by means of an interface on the user device.

5. The method of claim 4, wherein the data medium is integrated into the user device or comprises a separate data medium which is linked to the user device for the purpose of reading out the one-time password.

6. The method of claim 5, wherein the service provider sends the data medium out to the user together with the user device or separately.

7. The method of claim 1, wherein the user device transmits to the service provider's server, over a cryptographically secured communication channel, the signing request message compiled by the user device, together with the one-time password for the user device read out from the data medium.

8. The method of claim 1, wherein the compiled signing request message, which is transmitted to the service provider's server by the user device, is verified by the server by reference to the one-time password for the user device stored in the data store of the server.

9. A system comprising:
a server configured to provide a key certificate for a public device-key to a user device in a manipulation-proof manner, the user device being installed on a user's premises and being configured to receive a service from the server via a user device, the server comprising:
a memory and a processor programmed to:
generate a one-time password for the user device and transmitting the one-time password to the user device via a data medium,
receive a signing request message transmitted by the user device the received signing request message being generated by the user device in response to the generation of a cryptographic device-key pair by the user device, and including a keyed-hash value resulting from application of a keyed-hash function to the one-time password generated by the server and the public device-key generated by the user device, analyze the received signing request message, including the keyed-hash value, to verify the signing request message received from the user device based on the one-time password generated by the server for the user device, and
provide the key certificate to the user device in response to a successful verification of the signing request message received from the user device.

10. The system of claim 9, comprising:
a one-time password generator configured to generate an associated one-time password for each user device,
a data store that stores the one-time passwords that have been generated by user devices together with the device IDs of the user devices, and
a verification unit configured to verify a signing request message received from a user device based on a one-time password accessed from the data store.

11. The system of claim 10, wherein the one-time password for a user device, generated by the one-time password generator, is either filed on a data medium integrated into the user device and the user device is sent out to the user for installation, or the one-time password which has been generated for the user device is filed on a data medium which is separate from the user device, which is sent out to the user for the purpose of installing the user device either together with the user device or separately from the user device.

12. The system of claim 9,
wherein the server is a server of a service provider that provides a service to a user via the installed user device, and
wherein the user device comprises one of:
an energy gateway for the exchange of data with an energy supplier,
a medical device for the exchange of patient data with a service provider,
an alarm device for transmitting alarm messages to a service provider, and
a communication device for the exchange of data with a service provider.

13. The system of claim 11, wherein the one-time password for a user device, generated by the one-time password generator of the server, is stored on a USB stick data medium and sent out to the user.

14. The system of claim 10, wherein the verification unit of the server is configured to verify, based on a public key for the user device, a signature in the signature request message which has been received at the server.

\* \* \* \* \*